United States Patent [19]

Rogers et al.

[11] Patent Number: 4,682,865
[45] Date of Patent: Jul. 28, 1987

[54] CONCAVE MIRROR APPARATUS AND METHOD OF CONSTRUCTION

[75] Inventors: William E. Rogers, Haynersville; David N. Borton, Troy, both of N.Y.

[73] Assignee: Power Kinetics, Inc., Troy, N.Y.

[21] Appl. No.: 825,050

[22] Filed: Jan. 31, 1986

[51] Int. Cl.$^4$ .......................... G02B 5/10; G02B 7/18
[52] U.S. Cl. ..................... 350/607; 350/613; 350/641; 248/467; 29/446; 156/163; 156/196; 65/106
[58] Field of Search ............... 350/607, 608, 609, 611, 350/613, 631, 614, 628, 630, 641, 320; 248/467; 29/446; 156/163, 196; 65/106; 428/912.2

[56] References Cited

U.S. PATENT DOCUMENTS

| | | |
|---|---|---|
| 408,511 | 8/1889 | O'Brien . |
| 622,480 | 4/1899 | Ives ................................. 350/607 |
| 683,164 | 9/1901 | Wideen . |
| 2,129,513 | 9/1938 | Wegener ............... 350/607 |
| 2,707,903 | 5/1955 | Trombe ................ 350/613 |
| 3,514,776 | 5/1970 | Mulready ................. 343/6 |
| 3,998,522 | 12/1976 | Holzel ....................... 350/125 |
| 4,119,365 | 10/1978 | Powell ................. 350/607 |
| 4,162,825 | 7/1979 | Dowty ................. 350/295 |
| 4,429,953 | 2/1984 | Zehnpfennig et al. ............. 350/630 |

FOREIGN PATENT DOCUMENTS

| | | | |
|---|---|---|---|
| 2457458 | 6/1976 | Fed. Rep. of Germany ...... | 350/631 |
| 2482734 | 11/1981 | France ................. | 350/630 |
| 2002 | 1/1982 | Japan .................. | 350/607 |
| 1803 | 6/1982 | Japan .................. | 350/630 |

Primary Examiner—Jon W. Henry
Attorney, Agent, or Firm—Knobbe, Martens, Olson & Bear

[57] ABSTRACT

A normally flat, rectangular mirror element is supported on the front surface of a normally flat, rectangular backing element, which is more rigid than the mirror element. A pair of spacer elements are positioned between the mirror element and the backing element to raise the mirror element above the backing element. The spacer elements are located adjacent one pair of parallel edges of the mirror element. To curve the mirror about a central longitudinal bending axis which is parallel to the spacer elements, the mirror is depressed at its center, along the longitudinal axis, and secured to the backing element by a strip of double sided adhesive tape, which maintains the mirror element in the depressed position. To impart a concave curvature to the mirror element, the mirror element and the backing element are both curved about a transverse bending axis, which is orthogonal to the longitudinal bending axis, by pulling the backing element in a direction away from the mirror element while supporting two edges of the backing element on a frame to provide resistance to the pulling. The backing element is pulled by a rod which is secured by one end to the backing element and which threads into a turnbuckle at the other end. The turnbuckle is joined to a portion of the frame by another rod which extends from the frame and which also threads into the turnbuckle. Rotation of the turnbuckle varies the degree of curvature of the backing element and the mirror element about the transverse axis.

31 Claims, 14 Drawing Figures

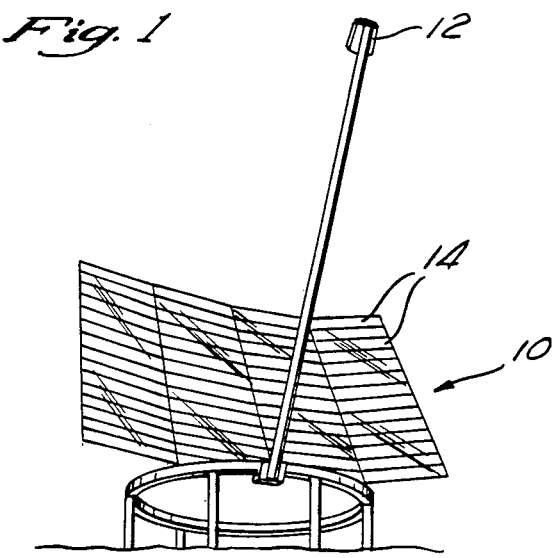
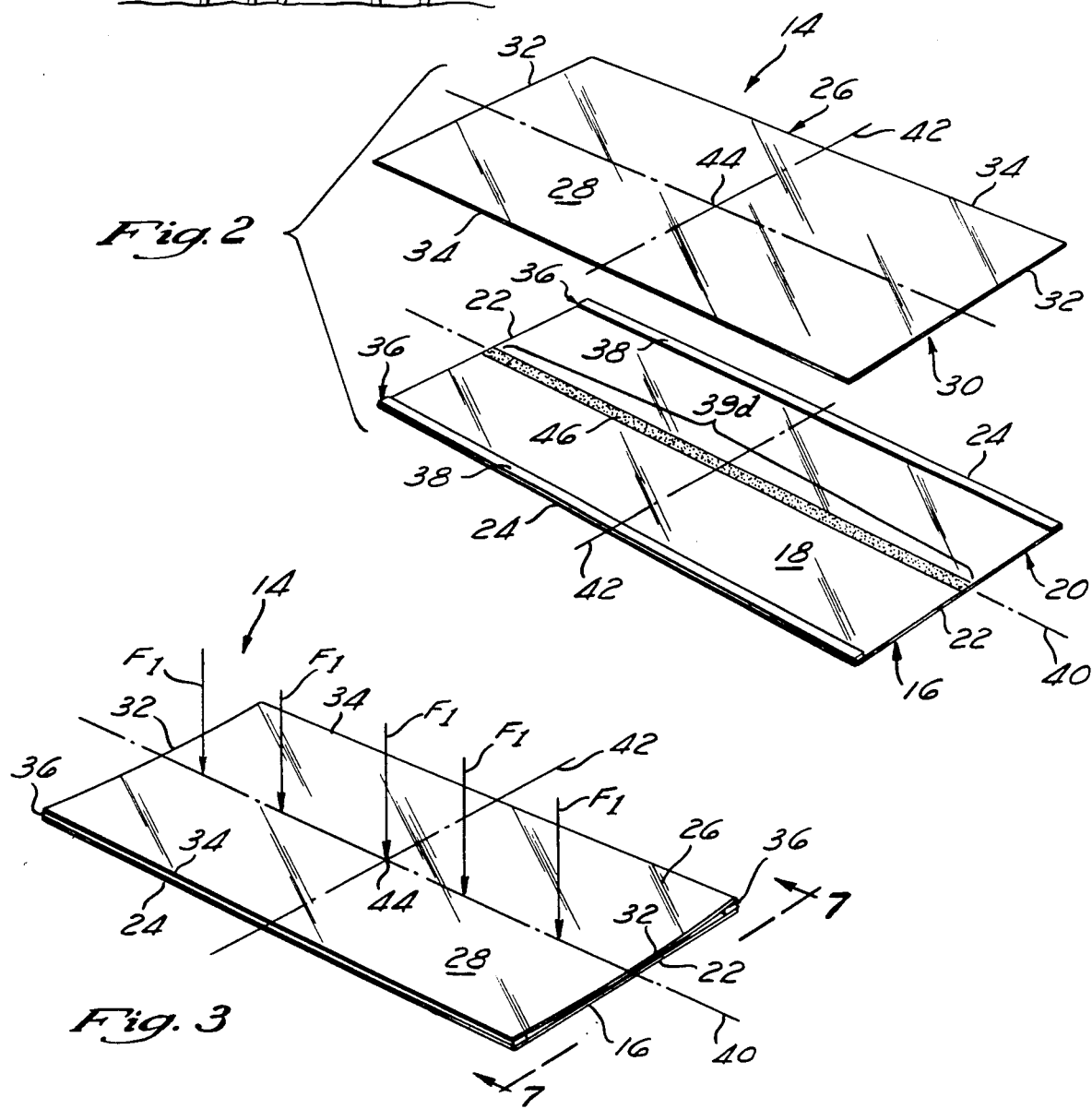

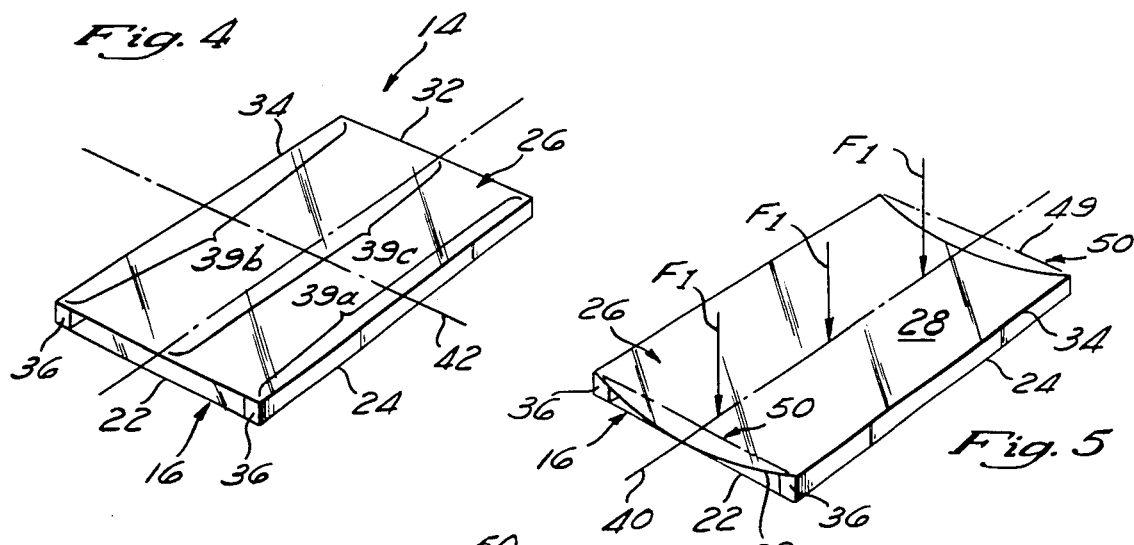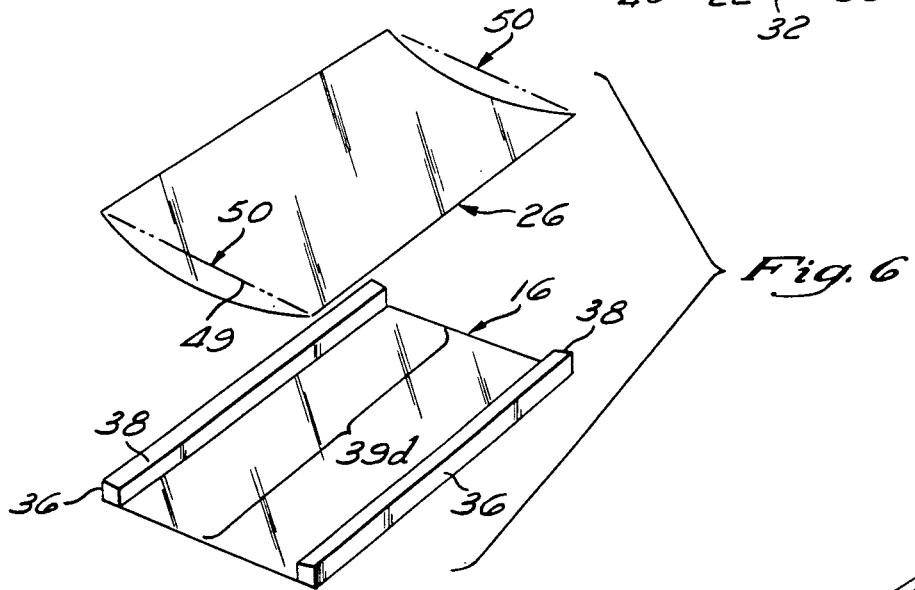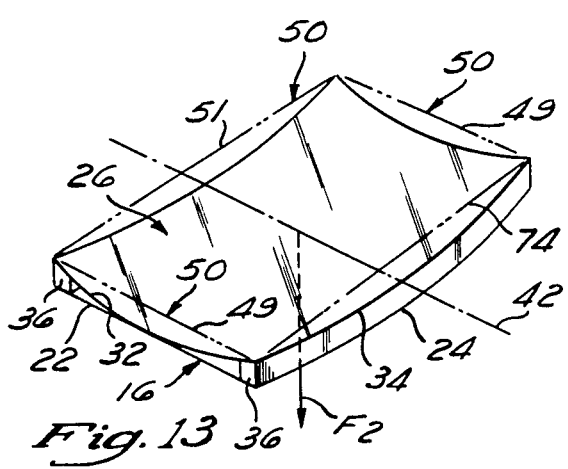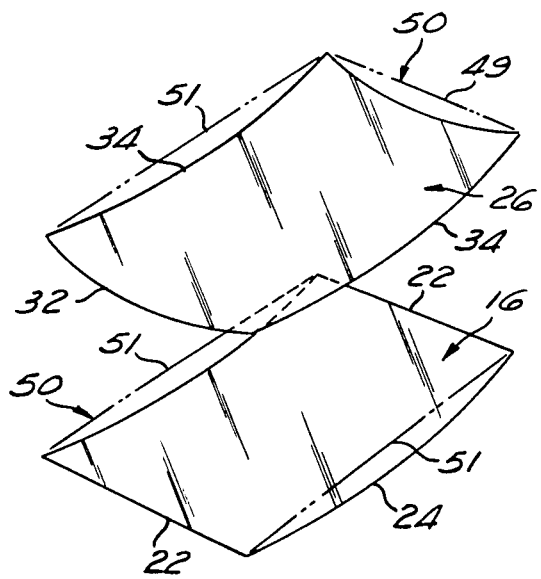

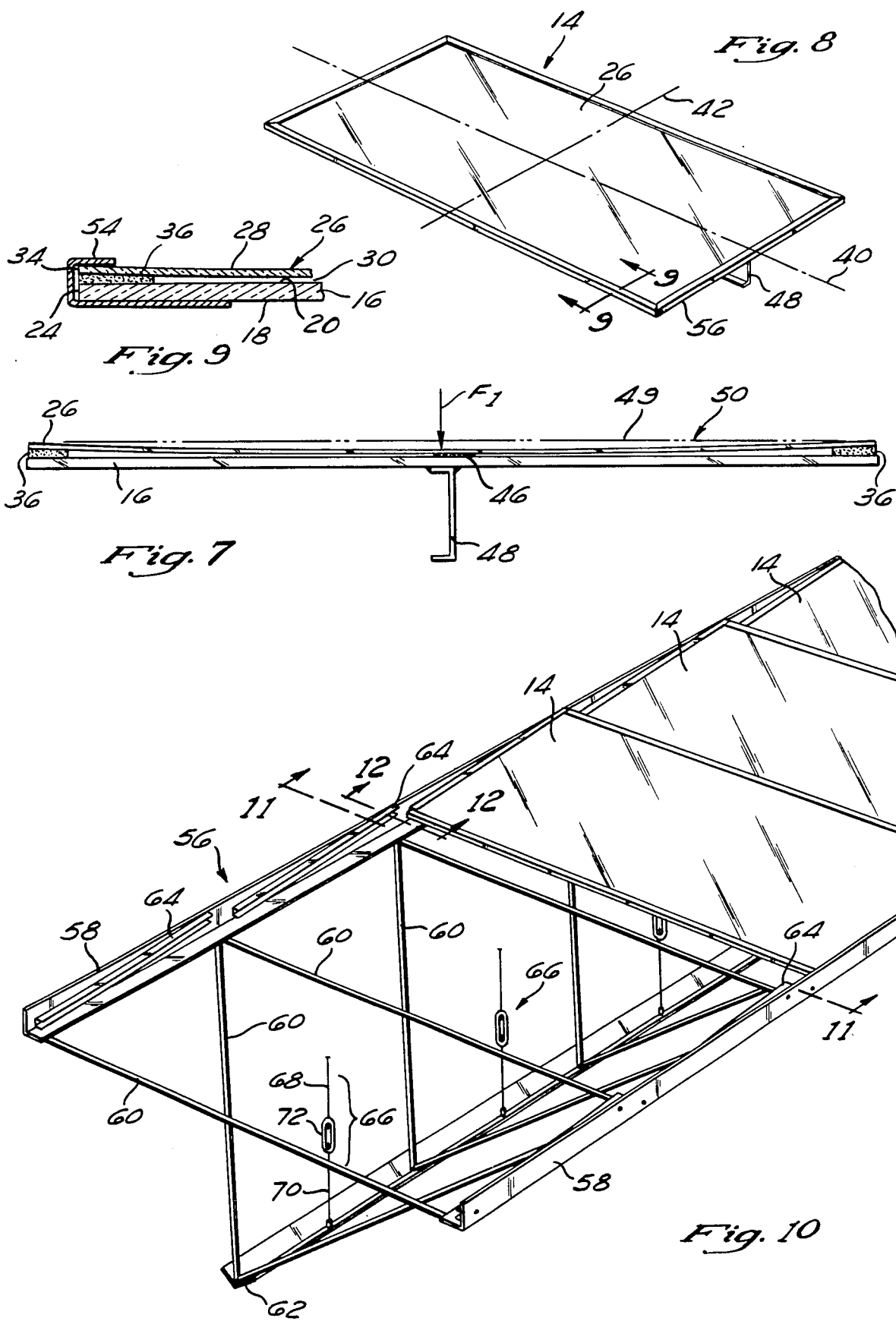

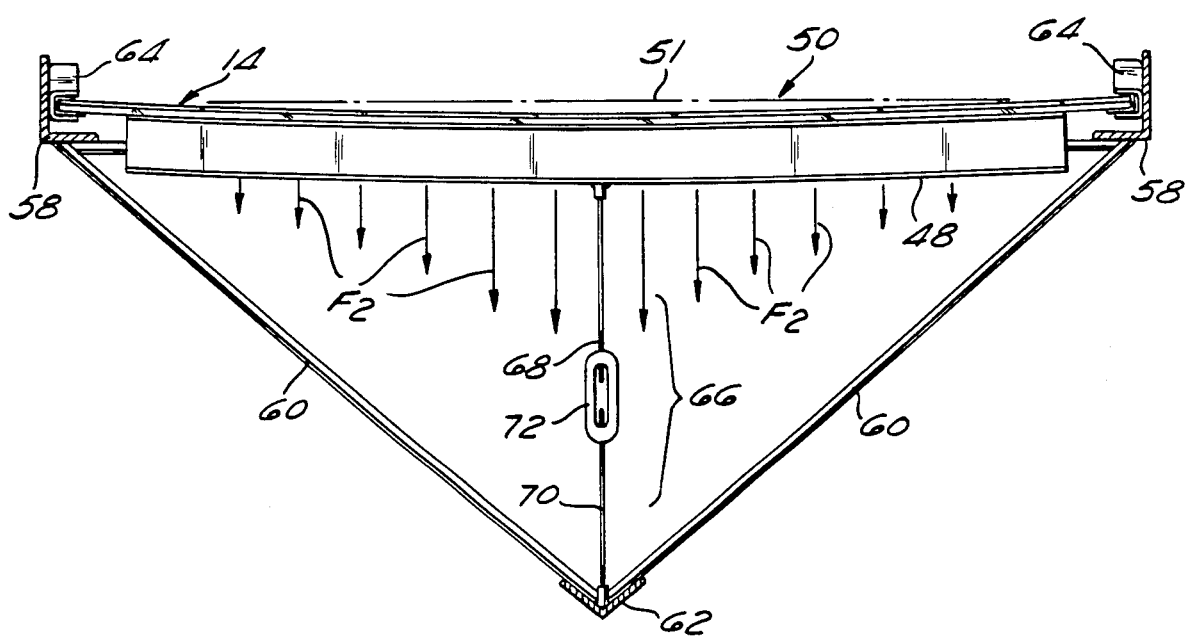
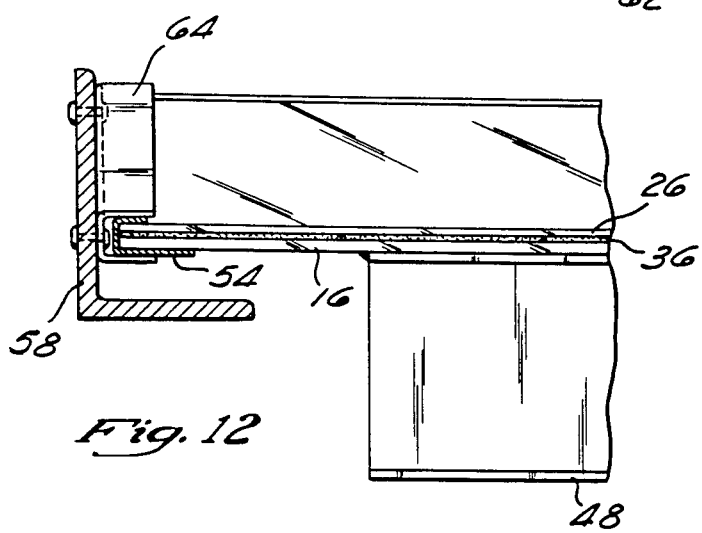

CONCAVE MIRROR APPARATUS AND METHOD OF CONSTRUCTION

BACKGROUND OF THE INVENTION

This invention relates generally to a mirror, and more particularly to a concave mirror used for reflecting and focusing an image of the sun in a solar energy collection system.

In one typical solar energy collection system, a large number of mirrors are arranged in an array with each mirror focused on a receiver that converts the reflected radiant energy of the sun into heat or electrical energy. It is desirable to use mirrors which are concave, or spherically curved, so that the reflected image of the sun can be concentrated within a relatively small area on the receiver. Rectangular mirrors are advantageous over round mirrors since when arranged to form an array, rectangular mirrors provide more reflective surface per unit area of the array. Also, more waste results from the production of a round mirror as compared to a rectangular mirror, since round mirrors are cut from rectangular sheets.

Generally, the mirrors used in such applications are formed from a flat sheet of glass having a silvered back surface. To reduce energy losses caused by the transmission of the sun's rays through the glass of the mirror, the mirror is very thin and, as a result, flexible. Thus, the mirror must be supported from behind in order for it to consistently maintain a concave shape which accurately focuses solar radiation onto the receiver. Previously, this support has been provided by a glass backing element which is thicker and more rigid than the mirror. The backing element is formed with a concave depression into which the flexible mirror is pressed to assume a concave shape. The abutting surfaces of the mirror and the backing element are laminated together with adhesive so that the two sheets of glass form a single laminated structure.

This lamination technique has suffered from several drawbacks, one being that forming the depression in the backing element requires a time consuming and costly machining procedure. Also, once the mirror is laminated to the backing element, the degree of curvature of the mirror cannot be adjusted. Thus, the depression must be precisely machined and the adhesive properly distributed over the depression or else the mirror may not be usable for its intended purpose.

Further, since the mirror and the glass backing element form a single, relatively thick structure, the laminated assembly has a greater moment of inertia, and thus is more rigid than either piece of glass separately. As a result, the assembly can withstand only a relatively small degree of deformation before maximum stress limits are reached, potentially causing breakage of the assembly when it is deformed by wind or thermal expansion. Stresses induced during shipment of the assembly to the construction site of the array may also cause breakage. Due to the precision required for laminating the mirror to the backing element, it is impractical to ship the mirror and backing element separately and assemble them at the construction site.

To minimize stress build-ups and potential breakage, the size of laminated mirror assemblies generally must be limited. As a result, a relatively large number of mirrors must be utilized to obtain a given amount of reflective surface area for an array. This is undesirable since the cost of constructing an array is dependent on the number of mirrors used.

Thus, a need exists for a non-laminated, preferably rectangular mirror having a concave curvature.

SUMMARY OF THE INVENTION

The present invention comprises a mirror having first, second, and third elongate strip portions in substantially parallel relationship to each other, and spaced from each other with the third elongate strip portion located between the first and second elongate strip portion. The mirror is mounted on a mounting apparatus comprising first and second members for supporting the mirror along the first and second elongate strip portions, respectively. The mounting apparatus includes a force applying device which is affixed to the third elongate strip portion, and applies force to the third elongate strip portion to displace the mirror relative to the first and second strip portions and thereby cause the mirror to curve about a first bending axis. This force applying device comprises a member having an elongate strip portion affixed to the third elongate strip portion of the mirror, and a device for bending the member to curve about a second bending axis, orthogonal to the first bending axis, preferably without bending the member about the first bending axis. Because the member is affixed to the mirror, such curving of the member causes the mirror to also curve about the second bending axis, so that the mirror assumes a concave shape. The bending device preferably includes a frame which supports the member at two locations on opposite sides of the second axis.

In the preferred embodiment, the member which is curved about the second axis comprises a substantially planar backing element having a front surface, and a back surface. The elongate strip portion of the member, which is affixed to the third elongate strip portion of the mirror, is disposed along the front surface of the backing element, and affixed to the third strip portion by means of an adhesive, such as a strip of double-sided adhesive tape. The first and second support members may comprise spacer elements which protrude from the front surface of the backing element.

The bending device of the preferred embodiment also includes an elongate stiffening member, secured to the back surface of the backing element, and a tensioning assembly, which is secured to the stiffening member. Preferably, the bending device is adjustable to vary the degree of curvature of the mirror about the second axis. This is accomplished by adjusting the tensioning assembly to apply the desired force to the stiffening member.

The apparatus of the present invention is particularly useful for rectangular mirrors, and thus, in the preferred embodiment, the mirror has a rectangular shape. Preferably, the first elongate portion of the mirror is located at one peripheral edge of the mirror, while the second elongate portion is located at an opposite peripheral edge of the mirror. The third elongate strip portion is preferably disposed at the first bending axis.

The present invention also includes a method of constructing a concave mirror apparatus which comprises the step of first curving the mirror about a first bending axis. Subsequent to this first step, the mirror is then curved about a second bending axis which is orthogonal to the first bending axis. Preferably, the mirror is shipped to the ultimate construction site after performing the first step, and the second step is performed at such construction site. During performance of the second step, the curvature of the mirror about the second axis is preferably adjusted relative to the curvature of the mirror about the first axis such that the mirror provides a reflected image at a desired location.

BRIEF DESCRIPTION OF THE DRAWINGS

FIG. 1 is a perspective view of a solar energy collection system having plurality of mirrors arranged in an array.

FIG. 2 is an exploded perspective view of the mirror element and the backing element of the present mirror assembly.

FIG. 3 is a perspective view of the mirror element and the backing element as assembled with the mirror element curved about a longitudinal bending axis.

FIG. 4 is a schematic perspective view showing the assembled mirror element and backing element before the mirror element is curved.

FIG. 5 shows the mirror element and backing element of FIG. 4 with the mirror element curved about the longitudinal bending axis.

FIG. 6 shows the curved mirror element and backing element of FIG. 5 with the elements separated.

FIG. 7 is an elevation view of the assembly of FIG. 3, as viewed along line 7—7.

FIG. 8 is a perspective view of the present mirror assembly with a molding surrounding the periphery of the assembly.

FIG. 9 is a cross-sectional view of the mirror assembly shown in FIG. 8, as taken along line 9—9.

FIG. 10 is a perspective view of a rack formed from a plurality of mirror assemblies installed on a frame.

FIG. 11 is a cross-sectional view of the frame and mirror assembly of FIG. 10, taken along line 11—11.

FIG. 12 is a partial cross-sectional view of the frame and mirror assembly of FIG. 10 along line 12—12.

FIG. 13 is a schematic perspective view showing the mirror element and backing element as assembled, with the mirror element curved about both the longitudinal bending axis and the transverse bending axis.

FIG. 14 shows the curved mirror element and curved backing element of FIG. 13 with the elements separated.

DETAILED DESCRIPTION OF THE PREFERRED EMBODIMENT

As shown in FIGS. 1 to 3, the present invention comprises a mirror assembly 14 which can be utilized in a solar energy collection system. The solar energy collection system comprises an array 10 of mirror assemblies 14, arranged to focus sunlight on a receiver 12 which converts the reflected solar radiation into heat or electrical energy.

Referring now to FIGS. 2 and 3, the present mirror assembly 14 is formed from a normally flat, rectangular backing element 16 which is preferably fabricated from a substantially planar sheet of glass. The backing element 16 has a planar front surface 18, a planar back surface 20 and two pairs of parallel edges 22 and 24. The edges 22 are shorter than the edges 24. The shorter pair of edges 22 are orthogonal to the longer pair of edges 24.

The assembly 14 also includes a mirror element 26 which is formed from a transparent material, preferably glass. The mirror element 26 has a planar front surface 28 and a planar back surface 30. The back surface 30 of the mirror element 26 is silvered so that when viewed from the front surface 28, the mirror element 26 is highly reflective. The mirror element 26 is normally flat, and has a rectangular outline defined by two pairs of parallel edges 32 and 34. The edges 32 are shorter than the edges 34, with the shorter pair of edges 32 being orthogonal to the longer pair of edges 34.

The backing element 16 is thicker and more rigid than the mirror element 26, although both the mirror element 26 and backing element 16 are flexible.

A pair of elongated, parallel spacer elements 36 are secured to the front surface 18 of the backing element 16. The spacers 36 have flat top surfaces 38 which protrude above the front surface 18. The spacer elements 36 each extend along an elongate strip of the backing element 16 which is parallel to and adjacent one of the parallel long edges 24.

As shown in FIG. 4, when the backing element 16 and the mirror element 26 are assembled, the mirror element 26 is mounted on the backing element 16, so that the two spacers 36 contact first and second elongate strip portions 39a, 39b of the mirror 26, each of which is adjacent to a long edge 34 of the mirror element 26. As a result, the entire mirror 26 in FIG. 4 is raised above the backing element front surface 18, and is coplanar with the top surfaces 38 of the spacer elements 36.

The mirror element edges 32 and 34 are the same length as the backing element edges 22 and 24, respectively. The mirror element 26 is centered on the front surface 18 of the backing element 16, as in FIGS. 3 and 4, such that the long pair of backing element edges 24 are aligned with the long pair of mirror element edges 34, and the short pair of backing element edges 22 are aligned with the short pair of mirror element edges 32.

As shown in FIG. 2, a strip of adhesive such as a strip of double sided adhesive tape 46, or alternatively a liquid adhesive, is placed on the backing element front surface 18 along an elongated central strip portion 39d of the backing element 16, disposed midway between and parallel to the spacers 36. Referring now to FIGS. 3 to 7, when a downward force F1 is applied to the mirror element 26, a third elongate strip portion 39c (FIG. 4) of the mirror element 26 is forced against the adhesive strip 46, so that the entire section of the mirror element 26 between the first and second strip portions 39a, 39b (FIG. 4) supported by the spacers 36 becomes displaced relative to those strips, and the mirror 26 assumes a slight curvature. When the mirror element 26 is displaced by the force F1, the adhesive contact between the silvered back surface 30 of mirror element 26 and the adhesive tape 46 along the third elongate strip portion 39c secures the mirror 26 to the backing element 16 and maintains the mirror element 26 in a curved position. As best seen in FIG. 7, the adhesive strip 46 is very thin such that the distance between the mirror strip 39c and the backing strip 39d is minimal, thereby placing the strips 39c, 39d in close proximity so that they are nearly contacting. Accordingly, the thickness of the spacer elements 36 is greater than the thickness of the adhesive tape 46 so that the adhesive tape 46 is spaced from a plane 50 formed by and extending between the top surfaces 38 of the spacers 36. The broken line 49 in FIGS. 5, 6, and 7 illustrates an edge of the plane 50 of the mirror element 26 in its normally flat position. Along the third strip portion 39c (FIG. 4) on the back surface 20 of the backing element 16, a stiffening member 48 (FIG. 7), preferably formed from a C-shaped channel, is secured to the backing element 16.

The curvature of the mirror shown in FIGS. 3, 5, 6, and 7 is about a longitudinal bending axis 40. The longitudinal bending axis 40 extends along the surface of the mirror 26, and along that portion of the mirror 26, in this case the third elongate strip portion 39c (FIG. 4), which is displaced the farthest from the plane 50 when the mirror 26 is curved by the force $F_1$. In the embodiment shown, the bending axis 40 is at the neutral axis of the curved mirror 26.

The spacers 36 are parallel to the longitudinal bending axis 40. The longitudinal bending axis 40 is parallel to the plane of the backing element 16 and also is parallel to the pair of long edges 24. Due to the similarity in shape and the proximity of the backing element 16 to the mirror element 26 when assembled, the longitudinal bending axis 40 will be considered to be a common axis of both the backing element 16 and the mirror element 26. When the mirror element 26 is curved only about the longitudinal axis 40, light reflected from the mirror 26 is concentrated into a narrow band which is smaller in area than the reflective surface of the mirror. The narrow band is parallel to the longitudinal axis 40 and approximately the same length as the long edges 24, 34, but narrower than the short edges 22, 32.

Preferably, the top surfaces 38 of the spacer elements 36 which engage the mirror element 26 are smooth and do not create excessive friction with the mirror element back surface 30. This enables the mirror element 26 to slide over the spacer elements 36, to accommodate for thermal expansion and contraction of the mirror element 26 and the backing element 16. Preferably, the mirror element 26 and backing element 16 are formed from the same material so as to have the same coefficient of thermal expansion.

Referring now to FIGS. 8 and 9, to seal the space between the mirror element 26 and the backing element 16, a molding 54 is used to completely surround the aligned edges 32, 34 and 22, 24 of the assembled mirror element 26 and the backing element 16. The molding 54 is J shaped in cross-section and hooks around the periphery of the assembly 14 as it abuts the back surface 18 of the backing element 16, the edges 22, 34, 22, 24 of both the mirror 26 and backing element 16, and the front surface 28 of the mirror element 26. Preferably, caulking or sealant is provided between the molding 54 and the mirror assembly 14 to prevent the seepage of moisture behind the mirror element 26, which can cause damage to the silvered back surface of the mirror element 30.

In an alternative embodiment (not shown), the molding 54 includes an inwardly projecting portion along the mirror assembly long edges 24, 34. This portion of the molding 54 is parallel to the plane of the backing element 16 and the mirror element 26, and extends between the mirror 26 and backing element 16 so as to separate them, thus obviating the need for the spacers 36.

Turning to FIGS. 10 through 12, the mirror assembly 14 is supported by a frame 56. The frame 56 is divided into segments or racks (not shown), each of which is capable of supporting a number of mirror assemblies 14. When a plurality of racks are positioned side by side, an array 10 of the type shown in FIG. 1 is formed. The frame 56 is formed from a pair of parallel angles or end supports 58 which are fixed stationary relative to each other by a plurality of cross-members 60 which extend between the end supports 58 and are secured thereto. Another angle, or central support 62, extends parallel to the end supports 58 and is spaced beneath the mid point of the end supports 58. Cross-members 60 extend between the end supports 58 and the central support 62 to maintain the central support 62 stationery relative to the end supports 58.

As is best shown in FIG. 11, the frame 56 has a triangular cross-section, with the end supports 58 and central support 62 forming the corners of the triangle. The cross-members 60 extending between the ends supports 58 form one side of the triangle, and the cross-members 60 between extending central support 62 and the end supports 58 form the other two sides of the triangle.

On each end support 58, a series of C shaped channels 64 are secured with the open sides of the channels facing toward the other end support 58. The channels on each end support 58 are positioned facing directly opposite a channel 64 on the other end support 58, thus forming pairs. The end supports 58 are spaced apart a distance approximately equal to the length of the long edges 24 and 34, and the channels 64 are a length approximately equal to the length of the short edges 22 and 32. The channels 64 are wide enough to provide clearance for the molding 54 surrounding the short edges 22 and 32 of the mirror assembly 14 so that the mirror assembly 14 can be supported by inserting the short edges 22 and 32 into the channels 64. The channels 64 are slightly inclined relative to the end supports 58, so that when used in the array 10, the reflection from the mirrors 26 will be directed towards the receiver 12.

As indicated in FIG. 11, each mirror assembly 14 is secured to the frame 56 by a tensioning assembly 66. The tensioning assembly 66 comprises an elongate, straight, upper rod 68 which is secured to the stiffening member 48 and which extends downward, away from the mirror assembly 14. One end of the rod 68 is secured to the stiffening member 48 at a point directly beneath the center 44 of the mirror 26, and the other end of the rod 68 is externally threaded. The tensioning assembly 66 includes elongated, straight lower rod 70 which is affixed at one end to the central support 62 and which extends upwardly, towards the mirror assembly 14, terminating in a threaded end.

The rods 68 and 70 are coaxial, and are joined together by a turnbuckle 72, into which each rod 68, 70 is threaded. Rotation of the turnbuckle 72 causes the rods 68, 70 to be drawn closer together or spread farther apart, depending on the direction of rotation.

As shown in FIGS. 11, 13, and 14, when the rods 68, 70 are drawn closer together by the turnbuckle 72, the tensioning assembly 66 exerts a pulling force $F_2$ on the stiffening member 48, which in turns pulls the back surface 20 of the backing element 16 in a downward direction, or in a direction away from the mirror element 26. To provide a resistance to the force $F_2$, the channels 64 support the short edges 32, 22 of the backing element 16 and the mirror element 26. The edges 32 and 22 remain stationary while the remainder of the backing element 16 and the mirror element 26 are displaced relative to their respective edges 32 and 22. As a result, the backing element 16 assumes a curvature. The force $F_2$ on the stiffening member 48 is at a maximum at the midpoint of the stiffening member 48, and is distributed non-uniformly along the length of the member 48, due to the centered location of the rod 68 relative to the channels 64. Since the mirror element 26 is secured to the backing element 16 by the strip of adhesive tape 46, the force $F_2$ causes mirror element 26 to curve to same extent as the backing element 16. Further, since the spacers 36 are affixed to the backing element 16, the spacers 36 curve with the bending element 16. The position of the mirror long edges 24 prior to curvature by the force $F_2$ are shown by broken lines 51. These broken lines 51 are in the plane 50 of the normally flat mirror 26.

The curvature imparted to the mirror 26 and backing element 16 by the force $F_2$ takes place about a transverse bending axis 42, which is orthogonal to the longitudinal bending axis 40. The transverse bending axis 42 runs along the strip of the mirror element 26 which is displaced the farthest from the stationary edges 32 by the force $F_2$. Like the longitudinal bending axis 40, the transverse bending axis 42 can be considered common to the mirror 26 and the backing element 16. The transverse bending axis 42 intersects the longitudinal bending axis 40 at the center 44 of the mirror element 26 and is parallel to the pairs of short edges 22 and 32. The channels 64 and edges 32, 22 are parallel to the transverse bending axis 42, and are spaced on either side from the transverse bending axis 42.

The curvature of the mirror element 26 about the transverse bending axis 42, combined with the curvature of the mirror element 26 about the longitudinal bending axis 40, results in an overall concave curvature of the mirror element 26. This concavity enables the mirror element 26 to concentrate a reflected image into an area which is smaller than that of the reflective surface area of the mirror element 26 in both length, or in a direction parallel to the longitudinal axis 40, and in width, or a direction parallel to the bending axis 42. This is in contrast to the narrow reflected image of the same length as the mirror 26 which results after curvature about the longitudinal bending axis 42 only, as discussed above.

The degree of curvature of the mirror element 26 about the transverse bending axis 42, and thus the point at which the concave mirror element 26 will focus a concentrated reflected image, can be adjusted relative to the curvature about the longitudinal bending axis 40. This adjustment is made by rotating the turnbuckle 72, which changes the force $F_2$. Rotation of the turnbuckle 72 applies the force $F_2$ and causes the reflected image from the mirror 26 to be shortened in length. As the force $F_2$ increases, the length of the reflected image changes in size relative to its width. That is, the reflected image becomes progressively shorter, while the width of the image remains substantially less than the width of the mirror 26. When a concave shape is achieved which focuses a reflected image of a desired size at desired location, rotation of the turnbuckle 72 is terminated.

As previously discussed in reference to FIG. 5, the first and second elongate strip portions 39a, 39b (FIG. 4) of the mirror element 26 which are supported by the spacers 36 remain stationary when the mirror element 26 is curved about the longitudinal bending axis 40 by the force $F_1$. However, as the mirror element 26 is curved by the force $F_2$ about the transverse bending axis 42, as shown in FIG. 13, the first and second strip portions 39a, 39b, as well as the third elongate strip portion 39c (FIG. 4), all curve along with the backing element 16. Thus, as the curvature about the transverse bending axis 42 changes, the contour of the mirror element 26 changes with respect to its curvature about the longitudinal bending axis 40.

To briefly summarize, the mirror assembly 14 is constructed by securing the spacer elements 36 to the front surface 18 of the backing element 16 along the long edges 24, and securing the double sided adhesive tape 46 along the longitudinal bending axis 40. The stiffening member 48 is secured to the back surface 20 of the backing element 16, also along the longitudinal bending axis 40. The mirror element 26 is then placed on top of the backing element front surface 18, with the silvered back surface 30 of the mirror element 26 facing down, toward the backing element 16. As shown in FIG. 4, the mirror element 26 is directly supported along two elongate strip portions by the spacers 36, and is spaced from the remainder of the backing element 16. The mirror element 26 is then depressed along the longitudinal bending axis 40 by force $F_1$ so that the third strip portion 39c of the mirror element 26, which runs along the longitudinal bending axis 40, engages the adhesive tape 46, securing the back surface 30 of the mirror element 26 to the backing element 16. This causes a curvature of the mirror element 26 about the longitudinal bending axis 40, as is shown in FIG. 5. The molding 54 is then filled with caulking, and secured around the periphery of the mirror assembly 14.

Although the next step is to impart a curvature to the mirror along the transverse axis 42 by adjusting the turnbuckle to curve the stiffening member 48, it is preferable that this step be performed at the ultimate construction site. In other words, the mirror assembly 14 is preferably shipped to the construction site with the mirror curved only about the longitudinal bending axis 40. This is desirable since when the mirror element 14 is curved only about the longitudinal bending axis 40, the mirror element 26 is under less stress, and thus is less prone to breakage during shipment than it is after curvature about the transverse bending axis 42 is additionally imparted. It is to be understood that, alternatively, the mirror assembly 14 can be shipped to the construction site at any stage during the assembly process, and the remaining assembly steps completed at the construction site.

Once at the construction site, the mirror assembly 14 is mounted on the frame 56 by sliding the short edges 22 and 32 of the mirror assembly 14 into a pair of opposing channels 64. The tensioning assembly 66 is then installed by securing one end of the upper rod 68 to the center of the stiffening member 48, and securing one end of the lower rod 70 to the center support 62. The threaded ends of the rods 68, 70 are then inserted into the turnbuckle 72.

By rotating the turnbuckle 72 to draw the rods 68, 70 closer together, a pulling force $F_2$ is exerted on the backing element 16 and, through the adhesive tape 46, on the mirror element 26 as well. The channels 64 support the edges 32, 22 in a stationary position as the mirror element 26 and the backing element 16 both become displaced relative to their respective stationary edges 32, 22, and curve about the transverse bending axis 42.

Rotation of the turnbuckle 72 varies the force $F_2$ thus varying the amount of curvature of the mirror element 26 about the transverse bending axis 42. As a result, the precise curvature required to focus the image reflected by the mirror element 26 onto the receiver 12 can be determined at the construction site by rotating the turnbuckle 72 until it is determined, by visual inspection, that the image is properly focused on the receiver 12.

In a preferred embodiment, the mirror element 26 measures $16\frac{1}{2}$ inches along the short edges 32, $36\frac{1}{2}$ inches along the long edges 34, and 0.062 inches thick.

The mirror element 26 is formed from low iron float glass. The backing element 16 has the same dimensions along its edges 22, 24, however is 0.120 inches in thickness, and is formed from regular float glass. The strip of double sided adhesive tape 46 preferably is formed from two side by side strips of PVC foam tape having acrylic contact adhesive on both sides. The two strips of tape are spaced apart slightly and have a total width of 1 inch. The thickness of the double sided tape 46 is 0.032 inches. The spacer elements 36 are each formed from a strip of PVC foam tape having acrylic contact adhesive on one side only, a width of ¼-inch and a thickness of 0.45 inches. Several sealants are suitable for caulking the molding 54, including those sold as CRL Worksite# GM 1000, Perennator V-23-2, and Sonoclastic NP-1.

We claim:

1. An apparatus comprising:
   a mirror having first, second and third elongate strip portions in substantially parallel relationship to each other, and spaced from each other with said third elongate strip portion located between said first and second elongate strip portions; and
   an apparatus for mounting said mirror comprising first and second members for supporting said mirror along said first and second elongate strip portions, respectively, said mounting apparatus including means, affixed to said third elongate strip portion, for applying force to said third elongate strip portion of said mirror to displace the portion of said mirror which is between said first and second strip portions relative to said first and second strip portions and thereby cause said mirror to curve about a first bending axis, said applying means comprising (1) a member having an elongate strip portion affixed to said third elongate strip portion of said mirror, and (2) means for bending said member to curve about a second bending axis orthogonal to said first bending axis, said bending means causing said mirror to curve about said second bending axis and thereby assume a concave shape.

2. The apparatus of claim 1 wherein said bending means includes frame means for supporting said member at two locations, said locations being on opposite sides of said second axis, said bending means curving said member about said second axis without curving said member about said first axis.

3. The apparatus of claim 2 wherein said member comprises a substantially planar backing element having a front surface, a back surface, said elongate strip portion of said member disposed along said front surface.

4. The apparatus of claim 3 wherein said bending means comprises an elongate stiffening member secured to the back surface of said backing element along said elongate strip portion of said member.

5. The apparatus of claim 4 wherein said bending means additionally comprises a tensioning assembly secured to said stiffening member.

6. The apparatus of claim 3 wherein said first and second support members comprise spacer elements which protrude from the front surface of said backing element, and wherein said mirror is affixed to the front surface of said backing element along said third elongate strip portion by an adhesive.

7. The apparatus of claim 6 wherein said force applying means further comprises a strip of double sided adhesive tape secured to the front surface of said backing element and to said mirror.

8. The apparatus of claim 1 wherein said bending means is adjustable to vary the degree of curvature of said mirror about said second axis.

9. The apparatus of claim 1 wherein said mirror is rectangular.

10. The apparatus of claim 1 wherein said mirror has a front surface and a back surface, and wherein said force applying means applies said force exclusively to the back surface of said mirror.

11. The apparatus of claim 1 wherein said first elongate portion of said mirror is located at one peripheral edge of said mirror and said second elongate portion of said mirror is located at the opposite peripheral edge of said mirror.

12. The apparatus of claim 1 wherein said third elongate strip portion is disposed at said first bending axis.

13. An apparatus comprising:
    a mirror;
    means for imparting a concave, curvature to said mirror by curving said mirror about first and second bending axes to provide a reflected image having two orthogonal dimensions which yield an area for said image smaller than the area of said mirror; and
    means for relatively adjusting the curvature of said mirror about said first and second axes to cause one of said orthogonal dimensions of said reflected image to change in size relative to the other of said orthogonal dimensions, said curving means including a mounting apparatus comprising:
    means for supporting said mirror along a pair of parallel, elongated strip portions on said mirror;
    means for displacing said mirror relative to said strip portions so as to curve said mirror about said first axis.

14. The apparatus of claim 13 wherein said supporting means comprises:
    a normally flat backing element having a front surface and a back surface; and
    a pair of parallel, elongate spacer elements protruding from said backing element front surface, said spacers supporting said mirror along said elongate strip portions.

15. The apparatus of claim 14 wherein said displacing means comprises:
    a strip of double sided adhesive tape secured on one side to said backing element, and on the other side to said mirror element.

16. An apparatus comprising:
    a backing element having a back surface and a front surface;
    a mirror element mounted on the front surface of the backing element;
    means for securing the mirror element to the backing element so as to curve the mirror element about a first bending axis, wherein said securing means includes a pair of spacer elements between the mirror element and the backing surface, said spacers raising the mirror above the backing element at the point at which the spacer elements contact the mirror, said spacers being positioned on either side of the first axis and spaced therefrom; and
    means for curving the backing element about a second bending axis which is orthogonal to said first axis, to cause the mirror element to additionally curve about said second axis thereby imparting a concave shape to the mirror element.

17. An apparatus comprising:

a backing element having a back surface and a front surface;

a mirror element mounted on the front surface of the backing element;

means for securing the mirror element to the backing element so as to curve the mirror element about a first bending axis, said securing means comprising a strip of double-sided adhesive tape; and means for curving the backing element about a second bending axis which is orthogonal to said first axis, to cause the mirror element to additionally curve about said second axis thereby imparting a concave shape to the mirror element.

18. An apparatus comprising:

a backing element having a back surface and a front surface;

a mirror element mounted on the front surface of the backing element;

means for securing the mirror element to the backing element so as to curve the mirror element about a first bending axis; and force applying means comprising a tensioning assembly extending between the back surface of said backing element and a surface which is stationary relative to a frame which supports the backing element, said tensioning assembly applying a force to said backing element which causes said backing element and said mirror element to curve about said second axis, said frame providing resistance to the force applied by said force applying means.

19. The apparatus of claim 18, wherein the length of said tensioning assembly is adjustable so as to vary the degree of curvature of said backing element and mirror element about said second axis.

20. The apparatus of claim 19 wherein said tensioning assembly comprises:

a first rod secured to said backing element at one end and protruding substantially normal therefrom, the other end of said first rod being threaded;

a second rod having one end which is threaded and another end secured to the frame; and a turnbuckle having a threaded portion which mates with the threaded ends of said rods, rotation of said turnbuckle causing said rods to be drawn closer together or spread farther apart, thus varying the degree of curvature of the backing element and mirror about the second axis.

21. A mirror apparatus, comprising:

a normally flat, substantially planar backing element having a front surface and a back surface;

a normally flat, substantially planar mirror element, said mirror element and said backing element each having two pairs of parallel edges which define a rectangular outline, said mirror supported on the front surface of said backing element with the edges of the backing element and mirror element aligned;

a pair of elongated spacer elements secured to the front surface of said backing element, each of said spacer elements positioned adjacent a mirror edge, said edges forming one pair of parallel mirror edges;

a strip of adhesive between the mirror element and the backing element, said adhesive disposed between said spacer elements and securing only a portion of said mirror element to said backing element to cause said mirror element to bend without bending the backing element;

a frame for mounting said backing element; and means for pulling said backing element in a direction away from the mirror element, said pulling means comprising (i) a first member secured to said backing element at one end, (ii) a second member having one end secured to a portion of said frame, and (iii) a device connected to said members, for drawing said members together to curve the backing element and thereby cause said mirror to assume a concave shape.

22. The apparatus of claim 21 wherein said mirror element and said backing element are fabricated from glass.

23. The apparatus of claim 21 wherein said backing element is more rigid than said mirror element.

24. The apparatus of claim 21 wherein the entire periphery of the assembled backing element and mirror element are surrounded by molding which abuts the back surface of the backing element, the edges of both the mirror element and the backing element, and the front surface of the mirror element to seal the space between the mirror element and the backing element.

25. The apparatus of claim 21 wherein said frame comprises:

a pair of elongated, parallel end supports;

a plurality of cross members extending between said end supports to maintain said end supports stationary relative to each other;

a plurality of channels secured to said end supports, the open ends of the channels on each end support being directly opposed so that the edges of the assembled mirror element and backing element which are parallel to the transverse axis can be inserted within the channels and supported thereby; and an elongated central support extending parallel to said end supports and spaced from the back surface of the backing element at the mid point between the end supports, a plurality of cross members extending between the center support and the end supports to maintain the center support stationary relative to the end supports, said second member being secured to said center support.

26. A method of imparting a concave shape to a mirror element which is supported by a backing element, said backing element having a front surface and a back surface, said method comprising the steps of:

placing the mirror element on the front surface of the backing element to support the mirror element;

curving the mirror element about a first bending axis without curving said backing element; and curving the backing element and mirror element about a second bending axis which is orthogonal to the first axis, so that the mirror element assumes a concave shape.

27. The method of claim 26, wherein the step of curving the mirror element about the first axis further comprises:

spacing the mirror element from the front surface of the backing element, on either side of the first axis;

depressing a portion of the mirror along the first axis, so as to curve the mirror about the first axis; and securing the mirror element to the backing element in the curved position.

28. The method of claim 27, further comprising the step of:

applying a strip of double-sided adhesive tape between the mirror element and the backing element along the first axis to secure the mirror element to the backing element in the curved position.

29. The method of claim 27, wherein the step of curving the backing element comprises the steps of:
   applying a force to the backing element in a direction away from the mirror element to curve the mirror element and backing element about the second axis; and
   supporting a portion of the periphery of the backing element to provide resistance to said force.

30. The apparatus of claim 27, further comprising the step of:
   adjusting the degree of curvature of said mirror element about said second axis.

31. The method of claim 30, wherein the degree of curvature of said mirror element is adjusted by varying the length of a tensioning assembly which extends between the backing element and a surface which is stationary relative to the portion of the periphery of the mirror element which is supported.

* * * * *